US006547013B2

(12) United States Patent
Riedl et al.

(10) Patent No.: US 6,547,013 B2
(45) Date of Patent: Apr. 15, 2003

(54) SCREW DRIVING TOOL

(75) Inventors: Reinhard Riedl, Finning (DE); Manfred Ludwig, Landsberg (DE); Michael Merz, Grabs (CH)

(73) Assignee: Hilti Aktiengesellschaft, Schaan (LI)

(*) Notice: Subject to any disclaimer, the term of this patent is extended or adjusted under 35 U.S.C. 154(b) by 0 days.

(21) Appl. No.: 09/882,970

(22) Filed: Jun. 15, 2001

(65) Prior Publication Data

US 2001/0052276 A1 Dec. 20, 2001

(30) Foreign Application Priority Data

Jun. 16, 2000 (DE) ........................................ 100 29 721

(51) Int. Cl.[7] .......................... B25D 17/14; B23B 45/00

(52) U.S. Cl. ....................... 173/132; 172/171; 279/157; 408/67; 408/112; 408/241 S

(58) Field of Search ............................ 173/11, 75, 132, 173/171; 279/157; 408/67, 113, 56, 112, 241 S; 81/429

(56) References Cited

U.S. PATENT DOCUMENTS

| | | | | | |
|---|---|---|---|---|---|
| 3,599,999 | A | * | 8/1971 | Schnizler et al. | 279/157 |
| 3,710,832 | A | * | 1/1973 | Lafferty, Sr. | 81/429 |
| 4,413,936 | A | * | 11/1983 | Kuhlmann | 173/11 |
| 4,597,453 | A | * | 7/1986 | Kilmer et al. | 173/171 |
| 5,380,132 | A | * | 1/1995 | Parks | 408/113 |
| 5,538,089 | A | * | 7/1996 | Sanford | 173/13 |
| 5,601,387 | A | * | 2/1997 | Sanford et al. | 408/113 |
| 6,176,162 | B1 | * | 1/2001 | Ludwig et al. | 81/429 |
| 6,240,816 | B1 | * | 6/2001 | Riedl et al. | 81/429 |

* cited by examiner

*Primary Examiner*—Anthony Stashick
(74) *Attorney, Agent, or Firm*—Sidley Austin Brown & Wood, LLP

(57) ABSTRACT

A screw driving tool including an axially displaceable, drive spindle (5) located in the housing, a bit holder (6) having a shank (7) which releasably connects the bit holder (6) with the drive spindle (5), an axially adjustable depth stop (9) surrounding the bit holder (6) and a portion of the drive spindle (5) and connectable with the tool housing (1), and a sleeve-shaped dust-repelling member (13) arranged between the depth stop (9) and the bit holder (6) and releasably connected with the bit holder (6).

8 Claims, 3 Drawing Sheets

SCREW DRIVING TOOL

BACKGROUND OF THE INVENTION

1. Field of the Invention

The present invention relates to a screw driving tool having a housing with a neck section, an axially displaceable drive spindle located in the housing, a bit holder having a shank for releasably connecting the bit holder with the drive spindle, an axially adjustable depth stop surrounding the bit holder and a portion of the drive spindle and connectable with the housing, and a sleeve-shaped dust-repelling member arranged between the depth stop and the bit holder.

2. Description of the Prior Art

All of bit holders, which are presently available on the market, have a very slim shape. In order to prevent penetration of dust in the bit holder/drive spindle connection region and into the interior of the driving tool, U.S. Pat. No. 5,568,849 discloses use of a dust-repelling member which is arranged between the depth stop and the bit holder and extends from the bit holder/drive spindle connection region in the screw-in direction. The depth stop has a plurality of side opening formed in its circumference in the region of the dust-repelling member. Through these side openings, dust, which penetrates into the depth stop, is removed. The dust-repelling member, which is connected releasably with the depth stop, because of the rotation of the bit holder relative to the dust-repelling member, is subjected to extensive wear and, therefore, need be often replaced in order to insure that no dust penetrates into the bit holder/drive spindle connection region. For replacing the dust-repelling member, a special pull-out tool is required. Such a tool is not always available at a construction site.

Accordingly, an object of the present invention is to provide a screw driving tool with a dust-repelling member in which the dust-repelling member is not subjected to any wear.

Another object of the present invention is to provide a screw driving tool with a dust-repelling member which can be simply and rapidly replace, without the use of any special pull-out tool.

A further object of the present invention is to provide a screw driving tool with a dust-repelling member which reliably prevents any penetration of the dust inside the tool.

SUMMARY OF THE INVENTION

These and other objects of the present invention, which will become apparent hereinafter, are achieved, according to the present invention, by releasably connecting the dust-repelling member with the bit holder.

The advantage of connection of the dust-repelling member with the bit holder consists in that it is removed from the driving tool together with the bit holder that is securable to the drive spindle with a spring-biased locking member. The bit holder, together with the dust-repelling member, can be removed by applying a force to the locking member for displacing it in its release position. No special tool is need for disconnecting the dust-repelling member and the bit holder. It is sufficient to put the dust-repelling member against and edge of the constructional component and to pull the bit holder out of it. A further advantage of the present invention consists in that the entire outer profile of the dust-repelling member can be visually inspected for search of any conspicuous traces of wear.

In order to keep the radial extent of the bit holder together with the dust-repelling member small, the dust-repelling member preferably is releasably connected with the shank of the bit holder.

The dust-repelling member according to the present invention can be formed, e.g., of two cylindrical sections of which one, the first section, directly adjoins the receiving region of the bit holder and has the same diameter as the receiving region. The second section, which adjoins the first section has a larger diameter and an outer profile which is separated from the inner wall of the depth stop by an annular gap. This prevents any friction between the dust repelling member and the inner wall of the depth stop, and practically, the dust repelling member is not subjected to any wear.

In order to prevent penetration of dust through the annular gap between the dust-repelling member and the depth stop into the bit holder/drive spindle connection region, a circumferential profile means is provided on the outer surface of the dust-repelling member. A certain amount of dust can accumulate on this profile and which can be removed when the bit holder, together with the dust-repelling member, is removed from the screw driving tool.

Advantageously, the circumferential profile is formed as a left-hand trapezoidal thread. With a right-handed rotation of the drive spindle, the left-hand trapezoidal thread forms, together with the annular gap, a delivery channel through which the dust in the gap is transported in the screw-in direction and is removed through the side openings formed in the depth stop.

At the end of the second section of the dust-repelling member facing in a direction opposite the screw-in direction, there is provided a flange-shaped widening that projects radially beyond the circumferential profile provided on the outer surface of the dust-repelling member and beyond the inner wall of the depth stop. This flange-shaped widening has two functions. It serves for sealing a bearing location in the neck section of the housing and for sealing a section of the drive spindle which projects into a receiving opening of the dust-repelling member. The other function of the flange-shaped widening consists in that it serves as a throw-away disc that throws the dust, which settles on the flange-shape widening during the stoppage of the driving tool or as a result of shocks, radially outwardly, e.g., toward the depth stop, upon start of the driving tool. The accumulated dust reaches the left-hand thread on the outer surface of the dust-repelling member and is transported by the threads in the screw-in direction to the side openings in the depth stop.

For reducing weight, the dust-repelling member advantageously is formed of a plastic material.

An additional protection of the bit holder/drive spindle connection region is advantageously achieved with a sleeve-shaped connection member which is used for connecting the depth stop with the housing. The connection member completely surrounds, in the axial direction, the neck section of the housing and partially surrounds the depth stop. The connection member is axially fixed with respect to the neck section with a ball-shaped locking member located in a side bore of the connection member. The locking member is pressed into a circumferential indentation formed in the neck section of the housing with an O-ring that serves as tensioning means. The O-ring is located in a circumferential groove formed in the sleeve-shaped connection member.

A rapid and simple axial adjustment of the depth stop with respect to the housing is effected with thread connection means which connects the depth stop with the connection member. To this end, the depth stop is provided with an outer thread which cooperates with a corresponding inner thread of the connection member.

In order to reliably remove the dust, which penetrated into the space between the outer surface of the dust-repelling member and the depth stop, the connection member is provided with a through-bore, which extend transverse to the screw-in direction and into which a side opening, which is formed in the depth stop, opens.

The novel features of the present invention, which are considered as characteristic for the invention, are set forth in the appended claims. The invention itself, however, both as to is construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
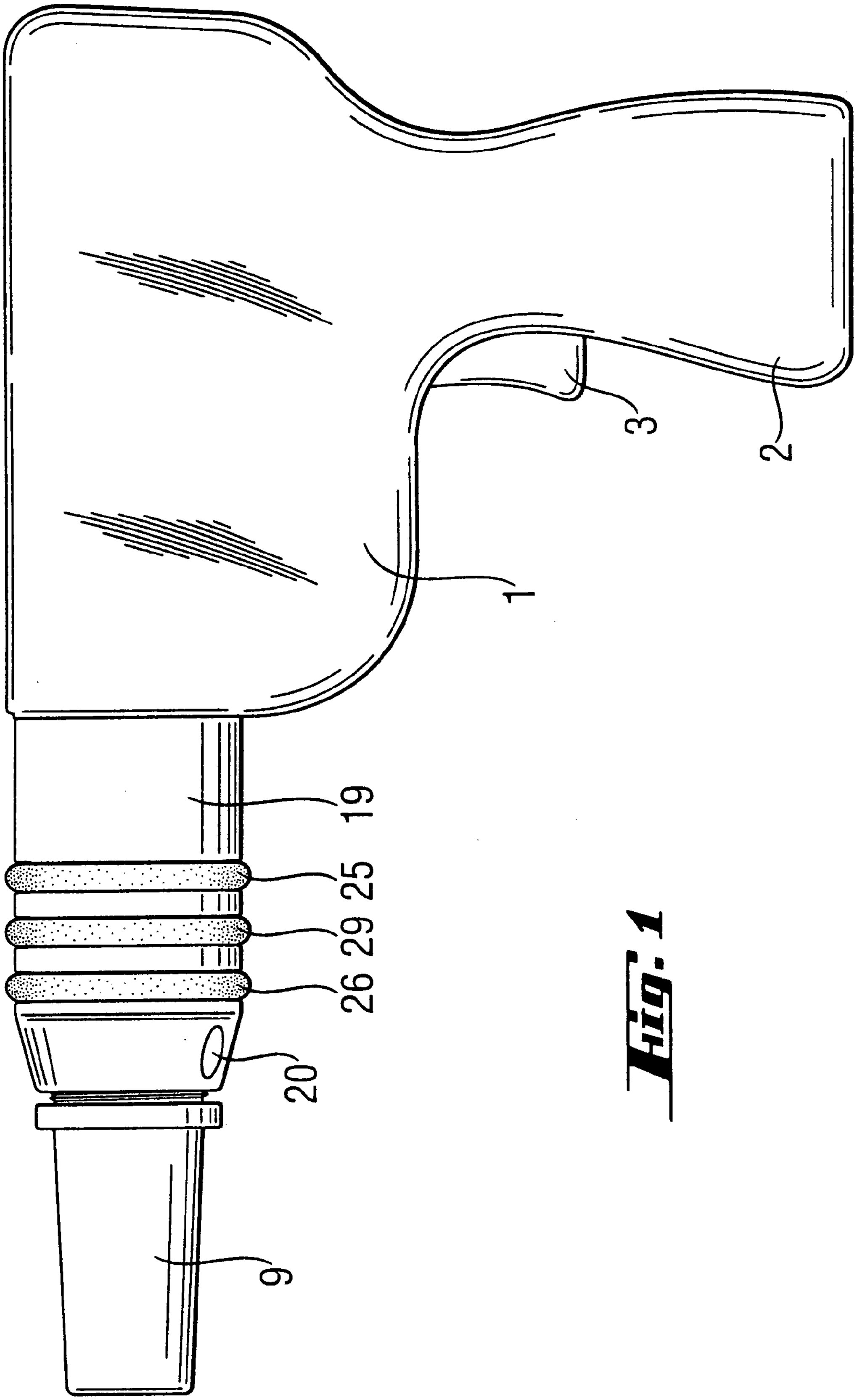
FIG. 1 a side view of a screw driving tool according to the present invention.

A screw driving tool according to the present invention, which is shown in FIG. 1, has a housing 1, a sidewise projecting handle 2, and an actuation trigger 3 provided in the handle 2. A sleeve-shaped connection member 19 adjoins the housing 1 at the end of the housing 1 facing in the screw-in direction. The connection member 19 has three, spaced from each other, circumferential grooves in which respective O-rings 25, 26 and 29 are received. The function of the O-ring 25, 26, 29 will be explained further below. A sleeve-shaped depth stop 9 projects beyond the connection member 19 in the screw-in direction.

Figure 2:
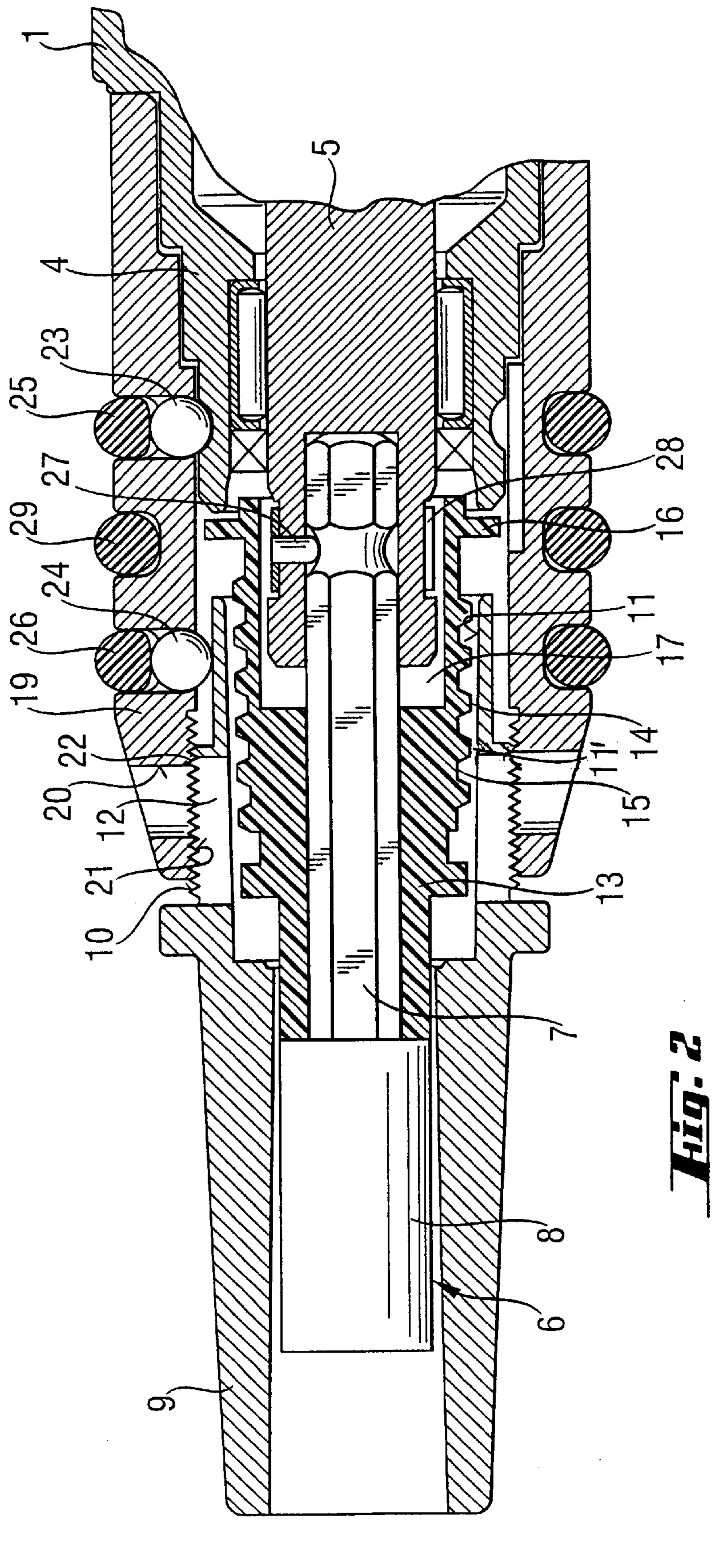
FIG. 2 a cross-sectional view, at an increased scale, of a front portion of the screw driving tool shown in FIG. 1 in its press-on position.

As shown in FIG. 2, the housing 1 has a neck section 4 projecting in the screw-in direction and the diameter of which is stepwise reduced in the screw-in direction. The stepped outer profile of the neck section 4 is designed for seating thereon of the connection member 19 the inner profile of which corresponds, at least partially, to the outer profile of the neck section 4. A ball-shaped locking member 23, which is located in a side bore of the connection member 19, serves for securing of the connection member 19 on the neck section 4. The ball-shaped locking member 23 is pressed into a corresponding depression in the neck section 4 by the O-ring 25 which serves as clamping means. The depression, in which the ball-shaped locking member 23 is received is located close to a next circumferential groove of the connection member.

A drive spindle 5, which projects beyond the neck section 4 in the screw-in direction, is rotatably supported in the housing 1 with a possibility of a longitudinal displacement therein. For supporting the drive spindle 5, a bearing is provided in the neck section 4, with a sealing ring being arranged in front of the bearing. A portion of the drive spindle 5, which projects beyond the neck section 4, has a blind bore with a hexagonal cross-section. In the region of the blind bore, the projecting portion of the drive spindle 5 is provided with a circumferential recess in which a tensioning spring 28 is arranged. The tensioning spring 28 cooperates with a pin-shaped locking member 27. The locking member 27 extends through a side opening, which is formed in the projecting portion of the drive spindle 5. The locking member 27 extends into a circumferential groove formed in a circumference of a shank 7 of a bit holder 6 which projects into the blind bore formed in the projecting portion of the drive spindle 5.

Figure 3:
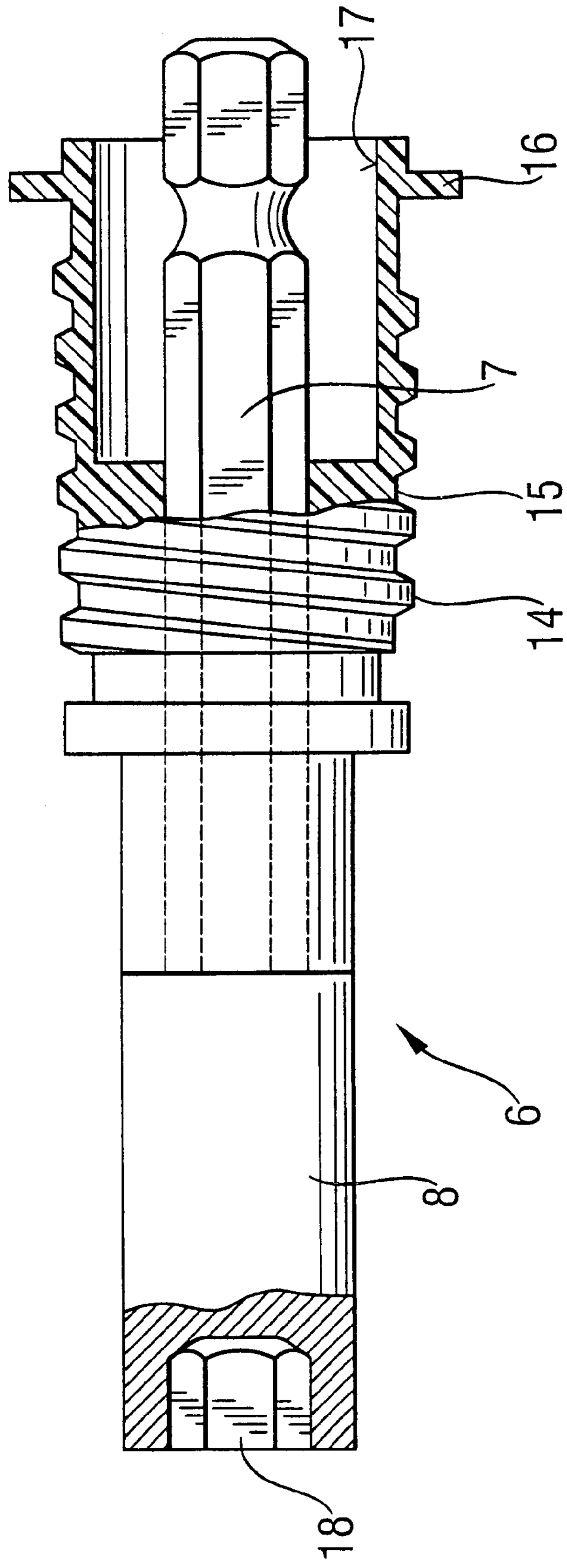
FIG. 3 a partially cross-sectional view, at an increased scale, of a bit holder insertable in the tool.

As particularly shown in FIG. 3, the shank 7 has a hexagonal cross-section corresponding to that of the blind bore. A receiving region 8 adjoins, in the screw-in direction, the shank 7. The receiving region 8 likewise has a blind bore 18. The blind bore 18 is open in the screw-in direction and has a non-circular cross section. The blind bore 18 serves for reception of a screwing-in or screwing-out tool, e.g., shaped as a screw bit. The receiving region 8 has a diameter which is larger than the largest cross-section of the shank 7. The transition between the shank 7 and the receiving region 8 is step-shaped.

The shank 7 is releasably connected with a sleeve-shaped, dust-repelling member 13. A through-bore of the dust-repelling member 13 is formed of two bore sections having different inner diameters. The cross-section of the first, facing in the screw-in direction, bore section corresponds substantially to the cross-section of the shank 7. A further bore section, facing in the direction opposite to the screw-in direction, has a cylindrical cross-section and a diameter larger than the largest inner dimension of the first bore section.

In the screw-in direction, the dust-repelling 13 is supported against a step-shaped widening of the bit holder 6 and has, in its first, facing in the screw-in direction, region, a diameter which corresponds to the outer diameter of the receiving region 8 of the bit holder 6. The second region 17, which has a larger outer diameter adjoins the first region. The outer side 14 of the second region 17 has a profile 15 formed as a left-handed trapezoidal thread. The facing in the direction opposite the screw-in direction, end region of the dust-repelling member 13 is provided with a flange-shaped widening 16 that projects radially beyond the outer surface 14 and which further contributes to the sealing of the bearing located in the neck section 4 of the housing 1. This is particularly advantageous when the screw driving tool is used for screwing-in of screws in a constructional component, with the connection member 19 and the depth stop 9 being removed.

The depth stop 9 has a central bore which stepwise widens in the direction opposite to the setting direction. The widened bore region has a plurality of side through-openings 12 which are distributed over the circumference of the depth stop 9 and which opens into the bores 20 formed in the connection member 19. The dust-repelling member 13 projects into this widened bore region, with an annular gap 11' remaining between the outer side or surface 14 of the dust-repelling member 13 and the inner wall 11 of the widened bore region of the depth stop 9.

A thread connection 22 connects the connection member 19 with the depth stop 9. The thread connection 22 includes an outer thread 10 provided on the depth stop 9 and an inner thread 21 provided in the connection member 19. To prevent an automatic rotation of the depth stop 9 relative to the connection member 19, a ball-shaped friction member 24 is pressed against the outer surface of the depth stop 9 with a O-ring 26 which serves as clamping means. The ball-shaped friction member 24 is located in a side bore formed in the connection member 19 and opening into another circumferential groove formed in the outer surface of the connection member 19 and in which the second O-ring 26 is located.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A screw driving tool, comprising a housing (1) having a neck section (4); an axially displaceable, drive spindle (5) located in the housing; a bit holder (6) having a shank (7) for releasably connecting the bit holder (6) with the drive spindle (5); an axially adjustable depth stop (9) surrounding the bit holder (6) and a portion of the drive spindle (5) and connectable with the housing (1); and a sleeve-shaped dust-repelling member (13) arranged between the depth stop (9) and the bit holder (6) and releasably connected with the bit holder (6), wherein the dust repelling member has at least one circumferential profile means (15) provided on an outer surface (14) of the dust-repelling member (13) and formed as a left-hand trapezoidal thread.

2. A screw driving tool, comprising a housing (1) having a neck section (4); an axially displaceable, drive spindle (5) located in the housing; a bit holder (6) having a shank (7) for releasably connecting the bit holder (6) with the drive spindle (5); an axially adjustable depth stop (9) surrounding the bit holder (6) and a portion of the drive spindle (5) and connectable with the housing (1); a sleeve-shaped dust-repelling member (13) arranged between the depth stop (9) and the bit holder (6) and releasably connected with the bit holder (6); and a sleeve-shaped connection member (19) for connecting the depth stop (9) with the housing (1), wherein the sleeve-shaped connection member (19) has a bore (20) extending transverse to a screw-in direction and into which a side opening (12) which is formed in the depth stop (9), opens.

3. A screw driving tool, comprising a housing (1) having a neck section (4); an axially displaceable, drive spindle (5) located in the housing; a bit holder (6) having a shank (7) for releasably connecting the bit holder (6) with the drive spindle (5); an axially adjustable depth stop (9) surrounding the bit holder (6) and a portion of the drive spindle (5) and connectable with the housing (1); a sleeve-shaped dust-repelling member (13) arranged between the depth stop (9) and the bit holder (6) and releasably connected with the bit holder (6), wherein an outer surface (14) of the dust-repelling member (13) is spaced from an inner wall (11) of the depth stop (9) by an annular gap (11'), and wherein the dust-repelling member (13) has at least one circumferential profile means (15) provided on the outer surface (14) of the dust-repelling member (13).

4. A screw driving tool according to claim 3, wherein the dust-repelling member (13) is releasably connected with the shank (7) of the bit holder (6).

5. A screw driving tool according to claim 3, wherein the dust-repelling member (13) has, at a free end thereof, a flange-shaped widening (16) projecting radially beyond the outer surface (14).

6. A screw driving tool according to claim 3, wherein the dust-repelling member (13) is formed of a plastic material.

7. A screw driving tool according to claim 3, further comprising a sleeve-shaped connection member (19) for connecting the depth stop (9) with the housing (1).

8. A screw driving tool according to claim 7, further comprising thread connection means (22) for connection the depth stop (9) with the sleeve-shaped connection member (19) with a possibility of axial adjustment of the depth stop (9).

* * * * *